United States Patent
Yoshimura

(10) Patent No.: US 7,349,712 B2
(45) Date of Patent: Mar. 25, 2008

(54) COMMUNICATIONS SYSTEM WITH TRANSMITTING POWER CONTROL AND METHOD FOR THE SAME

(75) Inventor: Takehiro Yoshimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 626 days.

(21) Appl. No.: 10/204,407

(22) PCT Filed: Jan. 13, 2001

(86) PCT No.: PCT/JP01/00676

§ 371 (c)(1),
(2), (4) Date: Aug. 27, 2002

(87) PCT Pub. No.: WO02/061975

PCT Pub. Date: Aug. 8, 2002

(65) Prior Publication Data

US 2003/0013475 A1   Jan. 16, 2003

(51) Int. Cl.
*H04B 7/00* (2006.01)
*H04Q 7/20* (2006.01)

(52) U.S. Cl. .......... 455/522; 455/69; 455/13.4; 455/561; 455/574; 455/453; 455/456.5; 455/114.3; 455/127.5; 370/311; 370/318

(58) Field of Classification Search .......... 455/522, 455/69, 571, 572, 573, 574, 450, 453, 114.3, 455/127.1, 127.5, 13.4, 63.4, 56.1, 456.5, 455/524, 525, 560, 561; 370/318, 311, 335, 370/342

See application file for complete search history.

(56) References Cited

U.S. PATENT DOCUMENTS 5,579,306 A * 11/1996 Dent .......... 370/330
5,903,841 A * 5/1999 Kondo .......... 455/436
5,930,684 A * 7/1999 Keskitalo et al. .......... 455/69
6,108,539 A * 8/2000 Ray et al. .......... 455/430
6,334,047 B1 * 12/2001 Andersson et al. .......... 455/69
6,334,058 B1 * 12/2001 Nystrom et al. .......... 455/453
6,400,966 B1 * 6/2002 Andersson et al. .......... 455/561
6,539,226 B1 * 3/2003 Furukawa et al. .......... 455/442
6,650,905 B1 * 11/2003 Toskala et al. .......... 455/522
6,690,939 B1 * 2/2004 Jonsson et al. .......... 455/453
6,718,162 B1 * 4/2004 Agin et al. .......... 455/63.1
6,778,839 B2 * 8/2004 Valkealahti .......... 455/522

(Continued)

FOREIGN PATENT DOCUMENTS

CN   1234707 A   11/1999

(Continued)

*Primary Examiner*—Matthew Anderson
*Assistant Examiner*—Shaima Q. Aminzay
(74) *Attorney, Agent, or Firm*—Oblon, Spivak, McClelland, Maier & Neustadt, P.C.

(57) ABSTRACT

One power control means 14 controls a transmitting power according to a control command to a mobile terminal which accesses one task when radio communication is performed with the mobile terminals in the corresponding sector, and a power control unit 15 gives a control command to each of a plurality of power control means 14 to collectively control the transmitting power to mobile terminals in a plurality of sectors, thereby for accomplishing reduction of interference and elimination of traffic maldistribution in a cell consisting of a plurality of sectors when radio communication is performed with mobile terminals for each sector.

20 Claims, 5 Drawing Sheets

U.S. PATENT DOCUMENTS

| | | | |
|---|---|---|---|
| 6,792,276 B1 * | 9/2004 | Butovitsch et al. | 455/453 |
| 6,799,045 B1 * | 9/2004 | Brouwer | 455/453 |
| 6,823,193 B1 * | 11/2004 | Persson et al. | 455/522 |

FOREIGN PATENT DOCUMENTS

| | | |
|---|---|---|
| EP | 0 505 341 A2 | 10/1992 |
| EP | 0 615 395 A1 | 9/1994 |
| GB | 2 311 191 A | 11/1997 |
| JP | 63-67034 | 3/1988 |
| JP | 6-268574 | 9/1994 |
| JP | 7-273722 | 10/1995 |
| JP | 8-47043 | 2/1996 |
| JP | 9-163443 | 6/1997 |
| JP | 9-298766 | 11/1997 |
| JP | 9-326746 | 12/1997 |
| JP | 10-32868 | 2/1998 |
| JP | 10-215218 | 8/1998 |
| JP | 2000-78648 | 3/2000 |
| JP | 2000-082992 | 3/2000 |

\* cited by examiner

COMMUNICATIONS SYSTEM WITH TRANSMITTING POWER CONTROL AND METHOD FOR THE SAME

This application is a 371 of PCT/JP01/00676 Jan. 31, 2001

BACKGROUND OF THE INVENTION

1. Technical Field

This invention is related to a communication system and a communication method, and particularly to control of transmitting power.

2. Background Art

FIG. 1 shows a partial construction in a communication system of CDMA (Code Division Multiple Access), in which reference numeral 1 is a PSTN (Public Switched Telephone Network), 2 is an RNC (Radio Network control apparatus), 3 is a plurality of BTS's (Basic Station), 4 is a mobile terminal which performs radio communication between the BTS 3, and 5 is a cell which is a range allowing communication between each BTS 3.

Now, the operation is described.

When the user of any mobile terminal 4 in a cell 5, which is capable of radio communication by down-link transmitting power, inputs a telephone number to originate a call (access), the BTS 3 corresponding to the cell 5 responds to the call and receives the radio signal from the mobile terminal 4. And, it identifies the mobile terminal 4 from the demodulated signal obtained by demodulating the received radio signal, and identifies the called terminal from the telephone number contained in the demodulated signal. Then, the connection request information for them is transmitted to the RNC 2.

RNC 2 responds to the connection request information to perform the connection control between the originating mobile terminal 4 and the called terminal. That is, if the called terminal is in another network, that information is sent to the PSTN 1. Or, if the called terminal is a mobile terminal 4 in the same radio network, the connection request information is sent to all the accommodated BTS's 4. Each BTS 4 originates a call to the mobile terminal 4 existing in the corresponding cell 5 to call the telephone number.

If the mobile terminal 4 corresponding to this telephone number exists in the cell allowing radio communication by the transmitting power of any BTS 3, it responds to the call to notify the user of an incoming call. And, if the user responds to the incoming call, a communication channel is established between the mobile terminal 4, which is the calling terminal, and the mobile terminal 4 which is the called terminal, and voice data is transmitted and received. If one or both in communication move from the region of the current cell into the region of another cell, the BTS 3 corresponding to the current cell senses that, and notifies the RNC 2 of the movement of the mobile terminal 4. The RNC 2 performs so-called handoff processing in response to the notification.

Further, the RNC 2 defines the maximum reference value and the minimum reference value of the mobile terminal 4 that can access each accommodated BTS 3, and sends common pilot transmitting power to control the transmitting power to the mobile terminal. As a result, as shown in FIG. 2, the BTS 4 adjusts the radius (field strength of transmitting power) of the corresponding cell 5. For instance, if the radius of the cell is assumed to be R1 when the number of mobile terminals 4 (referred to as "traffic number" is in a prescribed range, the radius of the cell 5 is set to R2 to expand the range allowing communication if the number of mobile terminals 4 decrease below the minimum reference value. Conversely, if the number of mobile terminals 4 exceeds the maximum reference value, the radius of the cell is set to R3 to narrow the range allowing communication.

FIG. 3 is a flowchart showing the operation of the cell radius adjustment, and in the figure, it is determined whether or not the traffic number has exceeded the maximum reference value (step ST1), and the cell radius is reduced if exceeded (step ST2). Further, it is determined whether or not the traffic number had decreased below the minimum reference value (step ST3), and the cell radius is extended if decreased (step ST4).

However, in the above conventional communication system and communication method, since the radius is reduced or extended for a certain cell alone, there is a problem that interference or traffic maldistribution in a plurality of cells occurs. Further, since the mobile terminals 4 do not always concentrically exist around the BTS 3, there is a problem that traffic control is insufficient with the conventional power control by adjustment of the cell radius.

The present invention was accomplished to solve the above described problems, and it aims to reduce interference and eliminate traffic maldistribution in a plurality of cells. Further, it aims to enable sufficient traffic control in a cell or in a plurality of cells.

BRIEF SUMMARY OF THE INVENTION

The communication system according to the present invention is adapted to have a power control means for controlling a transmitting power according to a control command to a mobile terminal which accesses one radio area when radio communication is performed between the mobile terminal in the one radio area; and a collective control means for giving the control command to each of a plurality of the power control means to collectively control the transmitting power to mobile terminals in a plurality of the radio areas.

This provides an advantage that, when radio communication is performed with a mobile terminal for each radio area, reduction of interference and elimination of traffic maldistribution in a plurality of radio areas can be accomplished. Further, there is also an advantage that sufficient traffic control can be performed in a radio area or in a plurality of radio areas.

In the communication system according to the present invention, the power control means is a power computing unit for computing the transmitting power according to a control command to a mobile terminal accessing one sector of a cell consisting of plurality of sectors when radio communication is performed with the mobile terminals in the one sector, and the collective control means is a base station for accommodating a plurality of power control means and giving the control command to each of plurality of the power control means to collectively control the transmitting power to mobile terminals in the cell.

This provides an advantage that reduction of interference and elimination of traffic maldistribution in one cell consisting of a plurality of sectors can be accomplished when radio communication is made between a mobile terminal for each sector. Further, there is also an advantage that sufficient traffic control can be performed in each sector.

In the communication system according to the present invention, the power control means is a base station for controlling the transmitting power according to a control command to a mobile terminal accessing one cell when radio communication is performed with the mobile terminals in the one cell, and the collective control means is a radio network control apparatus for accommodating a plurality of base stations and giving the control command to each of plurality of the base stations to collectively control the transmitting power to mobile terminals in a plurality of the cells. Further, there is also an advantage that sufficient traffic control can be performed in each cell.

This provides an advantage that reduction of interference and elimination of traffic maldistribution in a plurality of cells can be accomplished when radio communication is made between a mobile terminal for each cell.

In the communication system according to the present invention, the power control means controls the transmitting power to a mobile terminal for each period of a slot which is a predetermined amount of transmit-receive data, or of a frame consisting of a plurality of slots, for a common pilot channel transmitting power given from the collective control means.

This provides an advantage that the transmitting power in a plurality of radio areas can be controlled at high speed.

In the communication system according to the present invention, the collective control means is notified of a value of the number of mobile terminals received by each power control means, and determines the control command to be given to each power control means based on the notified value.

This provides an advantage that traffic load can be distributed in a wide range.

In the communication system according to the present invention, the collective control means gives the control command to each power control means so as to prevent the occurrence of absence of transmitting power between adjacent radio areas and overlapping of transmitting power between the adjacent radio areas in a plurality of collectively controlled radio areas.

This provides an advantage that reduction of interference and elimination of traffic maldistribution between the adjacent radio areas can be accomplished.

In the communication system according to the present invention, the collective control means grasps information on a common pilot channel transmitting power in each power control means, and controls a reference signal to interference power ratio and a reference number of random access channels in the each power control means.

This provides an advantage that optimum power control can be performed between the adjacent radio areas.

In the communication system according to the present invention, the collective control means defines a range of the maximum value and the minimum value of the common pilot channel transmitting power in each power control means, and if any accommodated power control means autonomously performs a power control in the corresponding radio area, it controls the common pilot channel transmitting power within the defined range for a power control means corresponding to the radio areas adjacent to the radio area.

This provides an advantage that the transmitting power in an individual radio area is controlled at high speed, and reduction of interference and elimination of traffic maldistribution among a plurality of radio areas can be accomplished.

A communication method according to the present invention is to give a control command to a power control means performing radio communication with mobile terminals in one radio area to control a transmitting power to each mobile terminals accessing the one radio area, thereby for collectively controlling the transmitting power to mobile terminals in a plurality of radio areas.

This provides an advantage that reduction of interference and elimination of traffic maldistribution in a plurality of radio areas can be accomplished when radio communication is performed between a mobile terminal for each radio area. Further, there is also an advantage that sufficient traffic control can be performed in a radio area and in a plurality of radio areas.

In the communication method according to the present invention, the power control means controls the transmitting power to the mobile terminal for each period of a slot which is a predetermined amount of transmit-receive data, or of a frame consisting of a plurality of slots, for a common pilot channel transmitting power given from a superordinate.

This provides an advantage that the transmitting power in a plurality of radio areas can be controlled at high speed.

In the communication method according to the present invention, upon notification of a value of the number of mobile terminals received by each of a plurality of the power control means, a control command to be given to each power control means is determined based on the notified value.

This provides an advantage that traffic load can be distributed in a wide range.

In the communication method according to the present invention, the control command is given to each of the plurality of power control means so as to prevent the occurrence of absence of transmitting power between adjacent radio areas and overlapping of transmitting power between the adjacent radio areas in a plurality of collectively controlled radio areas.

This provides an advantage that reduction of interference and elimination of traffic maldistribution between the adjacent radio areas can be accomplished.

The communication method according to the present invention, information on a common pilot channel transmitting power in each of the plurality of power control means are grasped to control a reference signal to interference power ratio and a reference number of random access channels in each power control means.

This provides an advantage that optimum power control can be performed between the adjacent radio areas.

In the communication method according to the present invention, a ranges of the maximum value and minimum value of the common pilot channel transmitting power in each of the plurality of power control means are defined, and if any power control means autonomously performs a power control in the corresponding radio area, the common pilot channel transmitting power is controlled within the defined ranges for the power control means corresponding to the radio areas adjacent to the radio area.

This provides an advantage that the transmitting power in an individual radio area can be controlled at high speed, and reduction of interference and elimination of traffic maldistribution among a plurality of radio areas can be accomplished.

BEST MODE FOR CARRYING OUT THE INVENTION

Now, to describe the present invention in more detail, the best mode for carrying out the present invention is described according to the accompanying drawings.

EMBODIMENT 1

Figure 1:
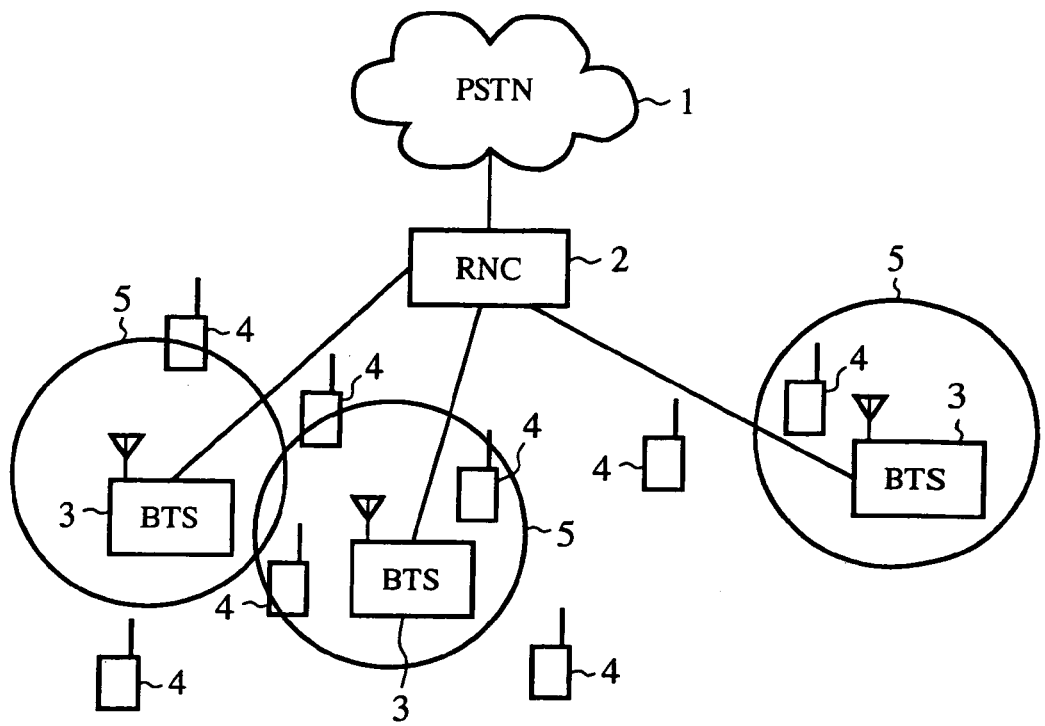
FIG. 1 is a diagram showing a partial construction in the conventional CDMA communication system.
Figure 2:
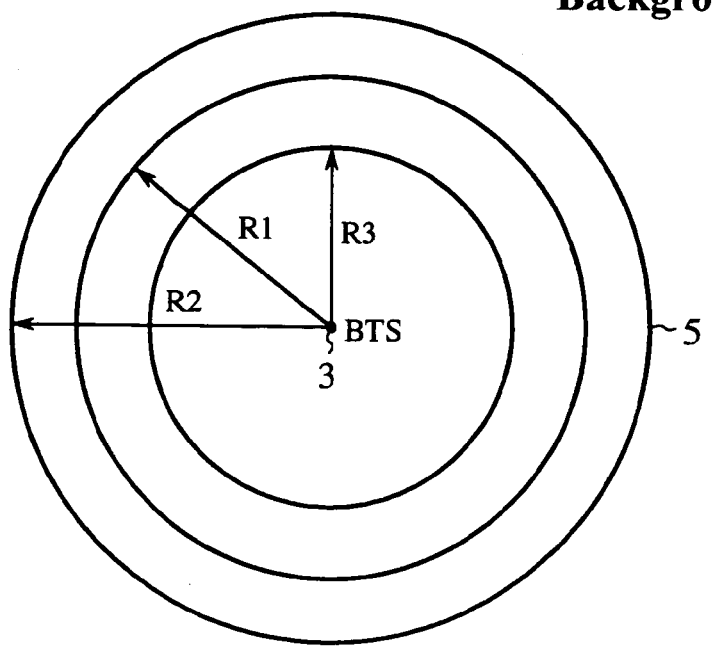
FIG. 2 is a diagram showing the adjustment of the cell radius in power control by the conventional communication system.
Figure 3:
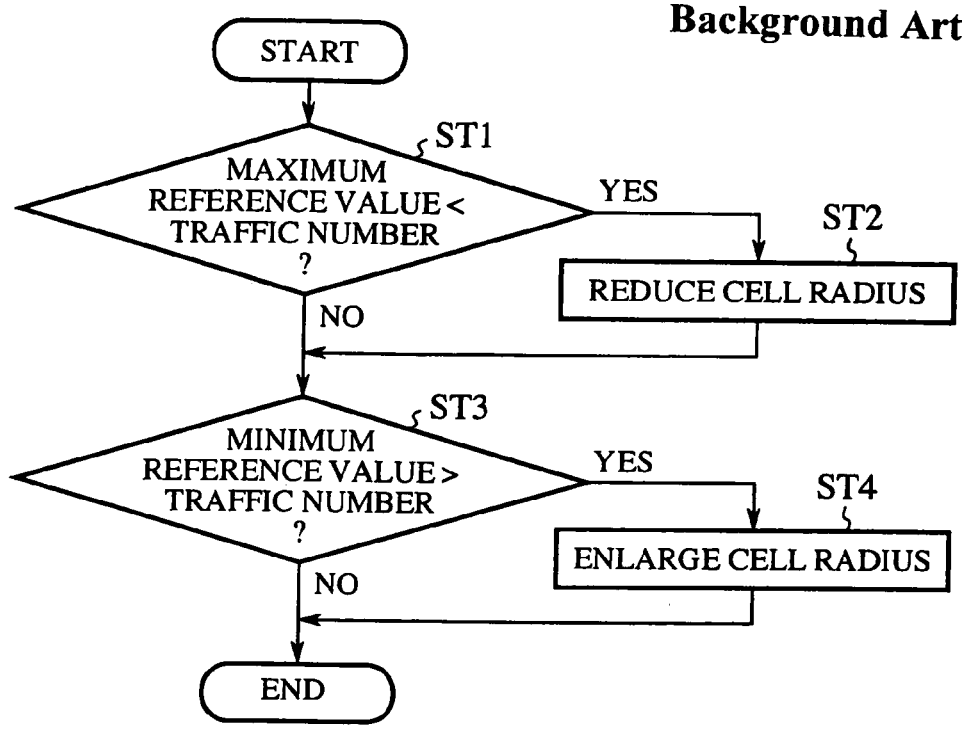
FIG. 3 is a flowchart showing the adjustment of the cell radius in the conventional communication system.
Figure 4:
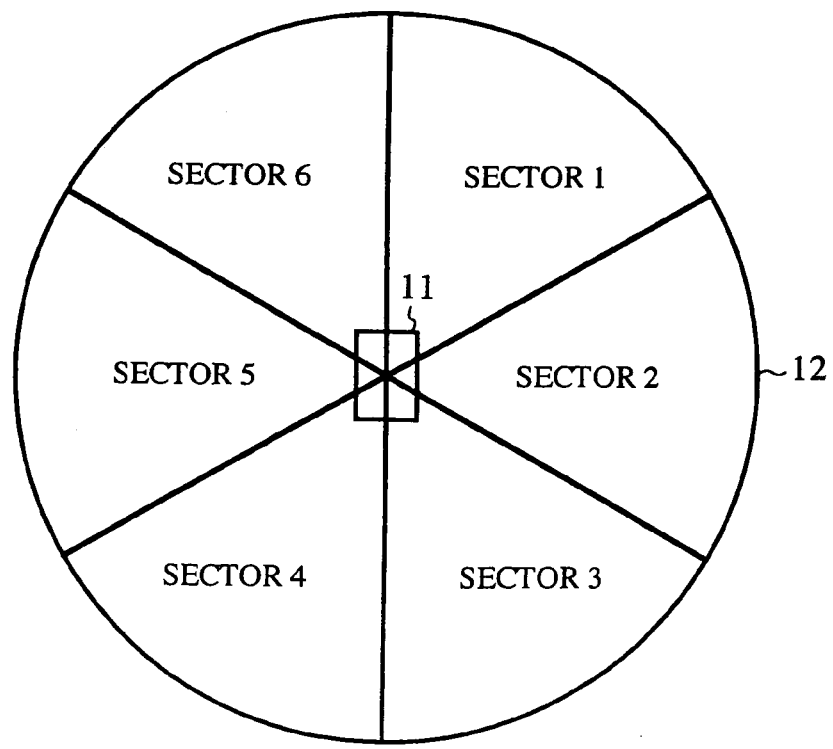
FIG. 4 is a diagram showing the cell structure of the communication system in the embodiment 1 for carrying out the present invention.

FIG. 4 is a diagram showing a cell structure of the communication system in embodiment 1 for carrying out the present invention, and in the figure, reference numeral 11 denotes a BTS (Base Station) connected to an RNC (Radio Network control apparatus), and 12 denotes a cell consisting of six sectors (a plurality of radio areas) managed by the BTS 11.

Figure 5:
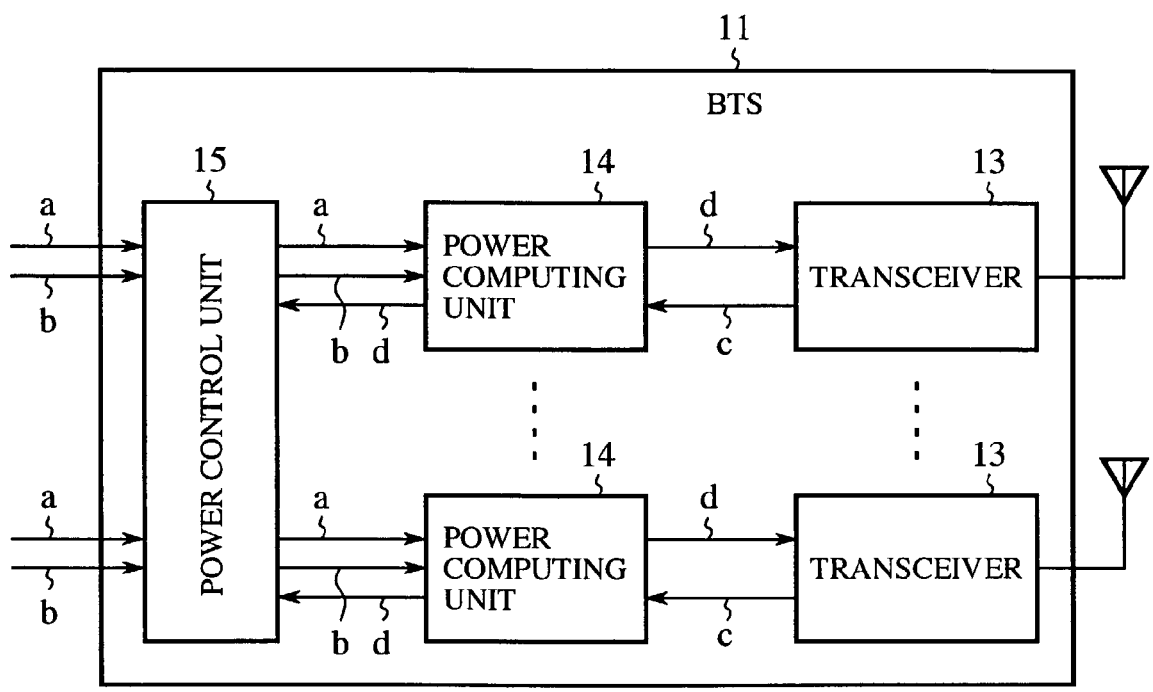
FIG. 5 is a block diagram showing the construction of the BTS of the communication system in the embodiment 1 for carrying out the present invention.
Figure 6:
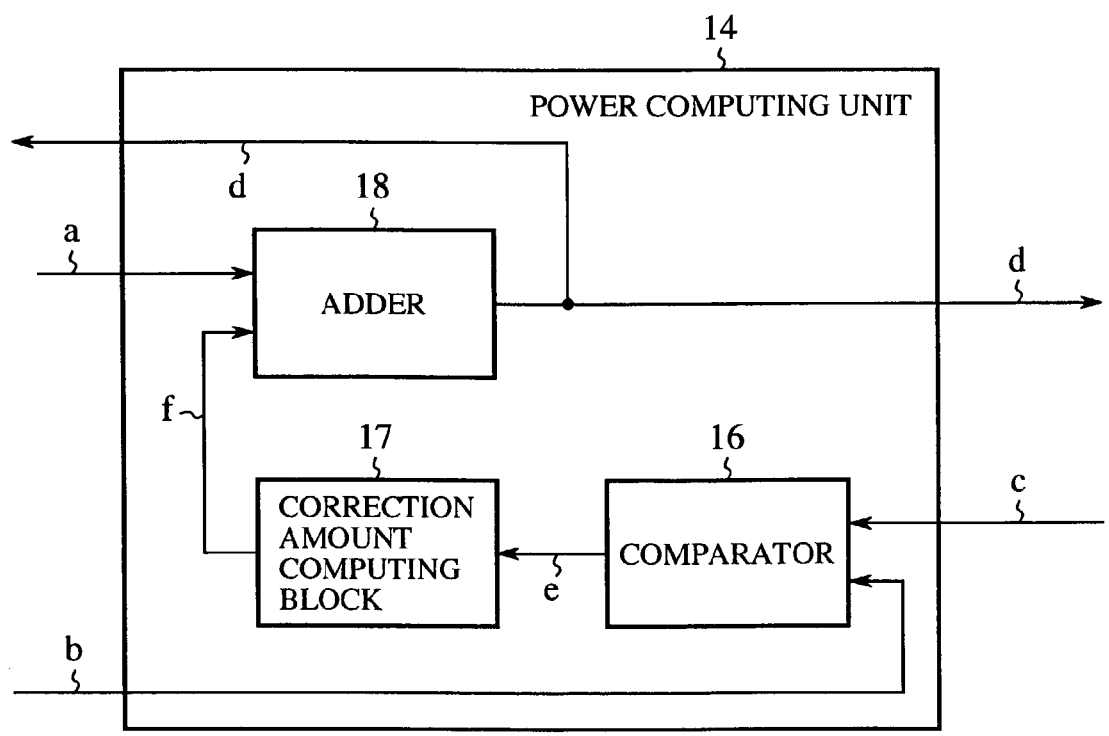
FIG. 6 is a block diagram showing the construction of the power computing unit in FIG. 5.

FIG. 5 is a block diagram showing the construction of the BTS 11 of the communication system in the embodiment 1 for carrying out the present invention, and in the figure, reference numeral 13 denotes six transceiver units corresponding to the respective sectors (sectors 1 to 6) of the cell 12, 14 denotes six power computing units (power control means) corresponding to the respective transceiver units 13, 15 denotes a power control unit (central control means) connected to the respective power computing units 14, and a to d are signals to be sent and received inside the BTS 11 and between the RNC (not shown). FIG. 6 is a block diagram showing the construction of the power computing unit 14 in FIG. 5, in which 16 denotes a comparator, 17 denotes a correction amount computing unit, 18 denotes an adder, and e and f are signals to be sent and received in the power computing unit 14.

Now, the operation is described.

Sent from the RNC, not shown, to the power control unit 15 of the BTS 11 are a power indicating signal a of the common pilot channel transmitting power (hereinafter referred to as "CPICH transmitting power") and a reference indicating signal b consisting of a reference signal to interference power ratio (hereinafter referred to as "SIR") and a reference number of random access channels (hereinafter referred to as "reference RACH number"). That is, a control command set by the superordinate RNC is transmitted to the subordinate BTS 11. The power control unit 15 gives the received power indicating signal a and reference indicating signal b to each of the six power computing units 14. The respective power control units 14 give the power indicating signal a (after the correction described later, power indicating signal d) to the respective corresponding transceiver units 13, and stores the reference indicating signal b in the memory (not shown) of the comparator 16 shown in FIG. 6.

Each transceiver unit 13 controls the transmitting power to a mobile, or the down-link transmitting power, according to the power indicating signal a. For instance, in urban areas where the number of mobile terminals existing in the corresponding sector is large, the range of the sector or the transmitting power is small, and in suburban and rural areas where the number of mobile terminals is small, the range of the sector (transmitting power) is large. Accordingly, the range of the cell 12 made up of six sectors is controlled by the power indicating signal a.

By regionally and statistically limiting the number of accessible mobile terminals by such power control, the so-called traffic number is controlled. The reference SIR and reference RACH number forming the reference indicating signal b stored in the comparator 16 of the power computing unit 14 is pertinent to this traffic control. This point will be further described later.

When each transceiver unit 13 receives the access from a mobile terminal existing in the corresponding sector, it measures the reception signal to interference ratio (hereinafter referred to as "reception SIR"). The transceiver unit 13 supplies the measured reception SIR to the corresponding power computing unit 14.

The power computing unit 14 stores the reception SIR supplied from the transceiver unit 13 in the memory of the comparator 16. The comparator 16 compares the stored reception SIR with the reference SIR. The comparator 16 determines whether the reception SIR is larger or smaller than the reference SIR. And, if the reception SIR is smaller than the reference SIR, it inputs a plus compare signal e to the correction amount computing unit 17, and if the reception SIR is larger than the reference SIR, it inputs a minus compare signal e to the correction amount computing block 17.

The correction amount computing block 17 computes the correction amount based on the inputted compare signal e, and inputs a correction signal f indicating the computed correction amount to the adder 18. The adder 18 adds the correction amount of the correction signal f to the CPICH transmitting power supplied from the RNC through the power control unit 15, and supplies the power indicating signal d of the corrected CPICH transmitting power to the transceiver unit 13 and the power control unit 15.

As a result, if the reception SIR is smaller than the reference SIR, or if the mobile terminals in the sector are less than the reference, the power computing unit 14 performs control to increase the down-link transmitting power to widen the range of the sector. Conversely, if the reception SIR is larger than the reference SIR, or if the mobile terminals in the sector is more than the reference, the power computing unit 14 performs control to reduce the down-link transmitting power to narrow the range of the sector.

In this case, the power computing unit 14 controls the transmitting power to mobile terminals for each period of a slot, which is a predetermined amount of transmit/receive data, or a frame consisting of plurality of slots, for the CPICH transmitting power given from the power control unit 15. Further, the down-link power control by the individual power computing unit 14 is autonomously performed.

Figure 7:
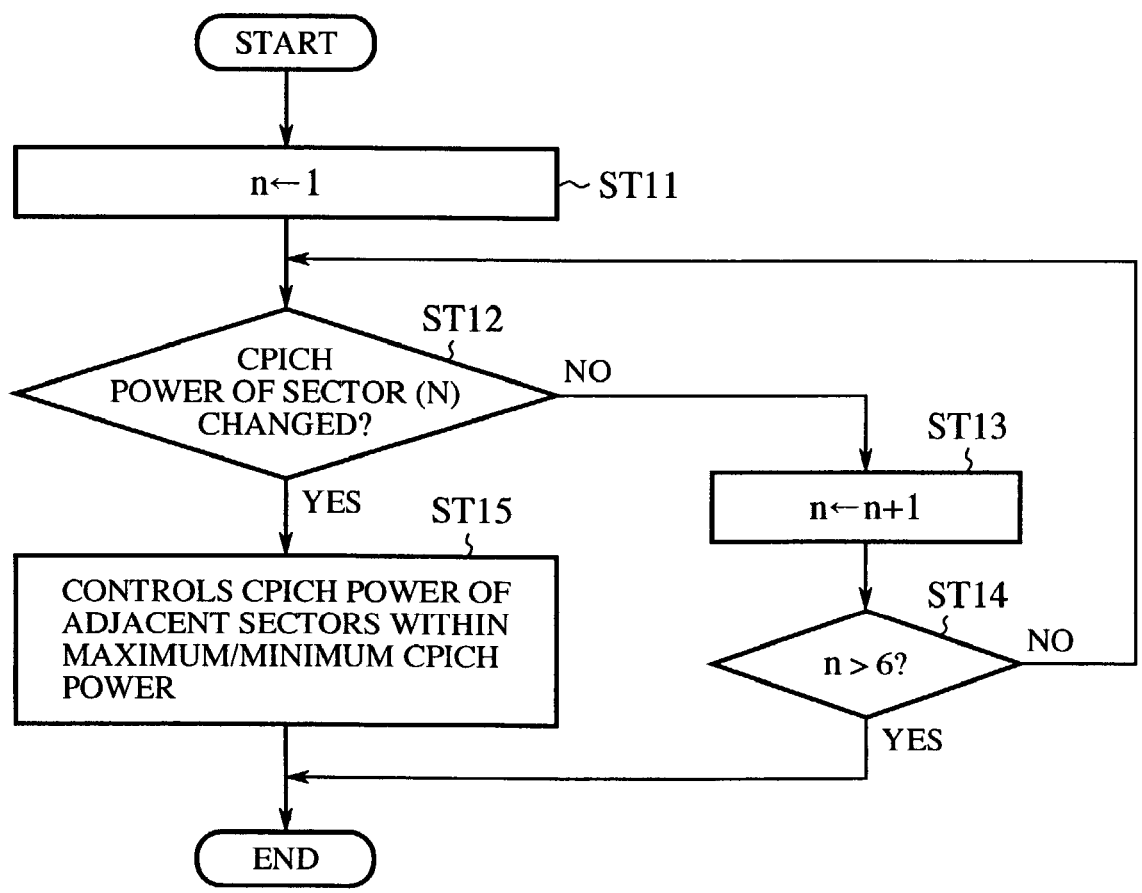
FIG. 7 is flowchart showing the operation of the communication system in the embodiment 1 for carrying out the present invention.

If the power control unit 15 is supplied with the power indicating signal d after correction from any power computing unit 14, it performs power control in the adjacent sectors. FIG. 7 is a flowchart showing the operation of the adjacent sector control processing. First, the value of a pointer n specifying a sector is set to 1 to specify the sector 1 (step ST11). And, the loop of steps ST12 to ST15 is repeated while incrementing the pointer n.

That is, it is determined whether or not the CPICH transmitting power of the sector (n) specified by the pointer n has changed (step ST12), and if there is no change, the value of the pointer n is incremented (step ST13). And, it is determined whether or not the value of n has exceeded 6 (step ST14). If the value of n is 6 or smaller, the process goes to step ST12 to determine whether or not the CPICH transmitting power of the sector (n) has changed. If the CPICH transmitting power has changed, the CPICH transmitting power of the adjacent sectors is controlled by the RNC within the range of the specified maximum/minimum CPICH transmitting power (step ST15).

As obvious from the foregoing, in accordance with the embodiment 1, since there are provided the power computing unit 14 for controlling the transmitting power to a mobile terminal accessing one task according to a control command when radio communication is performed between a mobile terminal in one sector, and the power control unit 15 for collectively controlling the transmitting power to mobile terminals in the cell 12 of a plurality of sectors by giving a control command to each of the plurality of power computing unit 14, there is an advantage that reduction of interference and elimination of traffic maldistribution in the cell consisting of a plurality of sectors can be accomplished. Further, there is also an advantage that sufficient traffic control can be performed in a sector and a cell.

In the embodiment 1, since the power computing unit 14 controls the transmitting power to a mobile terminal for each period of slot, which is a predetermined amount of transmit/receive data, or a frame consisting of a plurality of slots, for the CPICH transmitting power given from the power control unit 15, there is an advantage that the transmitting power in a plurality of radio areas can be controlled at high speed.

Further, in the embodiment 1, since the power control unit 15 is notified of the number of mobile terminals received by each power computing unit 14, and determines a control command, or CPICH transmitting power, to be given to each power computing unit 14 based on the notification, there is an advantage that traffic load can be distributed in a wide range.

Further, in the embodiment 1, since the power control unit 15 gives a control command to each power computing unit 14 so as to prevent the occurrence of absence of transmitting power in the adjacent sectors in a plurality of collectively controlled sectors and overlapping of transmitting power between the adjacent sectors, there is an advantage that reduction of interference and elimination of traffic maldistribution between the adjacent sectors can be accomplished.

Further, in the embodiment 1, since the power control unit 15 defines the ranges of the maximum value and minimum value of the CPICH transmitting power in each power computing unit 14, and if any accommodated power computing unit 14 autonomously performs power control in the corresponding sector, then it controls the CPICH transmitting power within the defined ranges for the power computing units 14 corresponding to the sectors adjacent such sector, there is an advantage that the transmitting power in each sector can be controlled at high speed, and reduction of interference and elimination of traffic maldistribution among cells consisting of plurality of sectors can be accomplished.

Further, as a variation of the embodiment 1, the power control unit 15 may grasp the information on the CPICH transmitting power in each power computing unit 14 to control the reference SIR and reference RACH number in each power computing unit 14. In this case, there is an advantage that optimum power control can be performed between the adjacent radio areas.

EMBODIMENT 2

Figure 8:
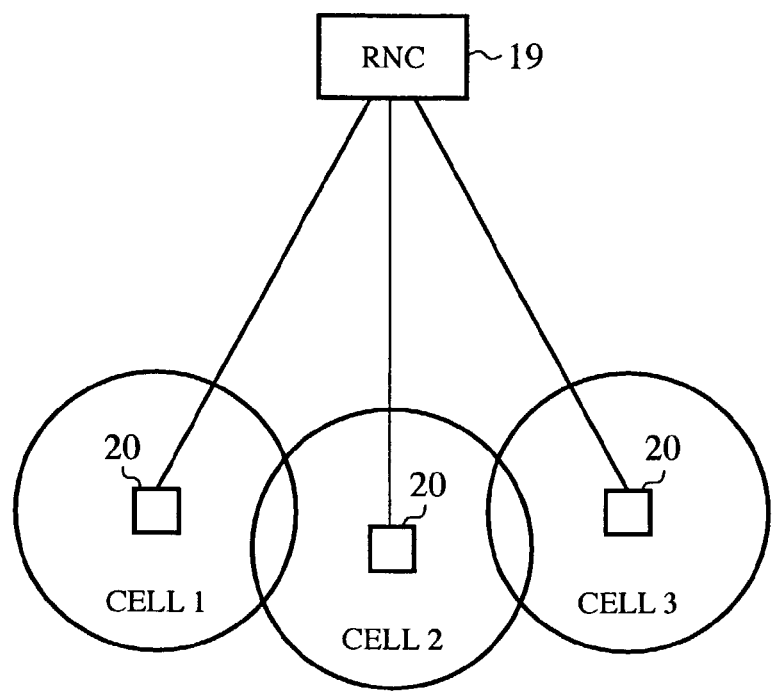
FIG. 8 is a diagram showing the communication system in the embodiment 2 for carrying out the present invention.
Figure 9:
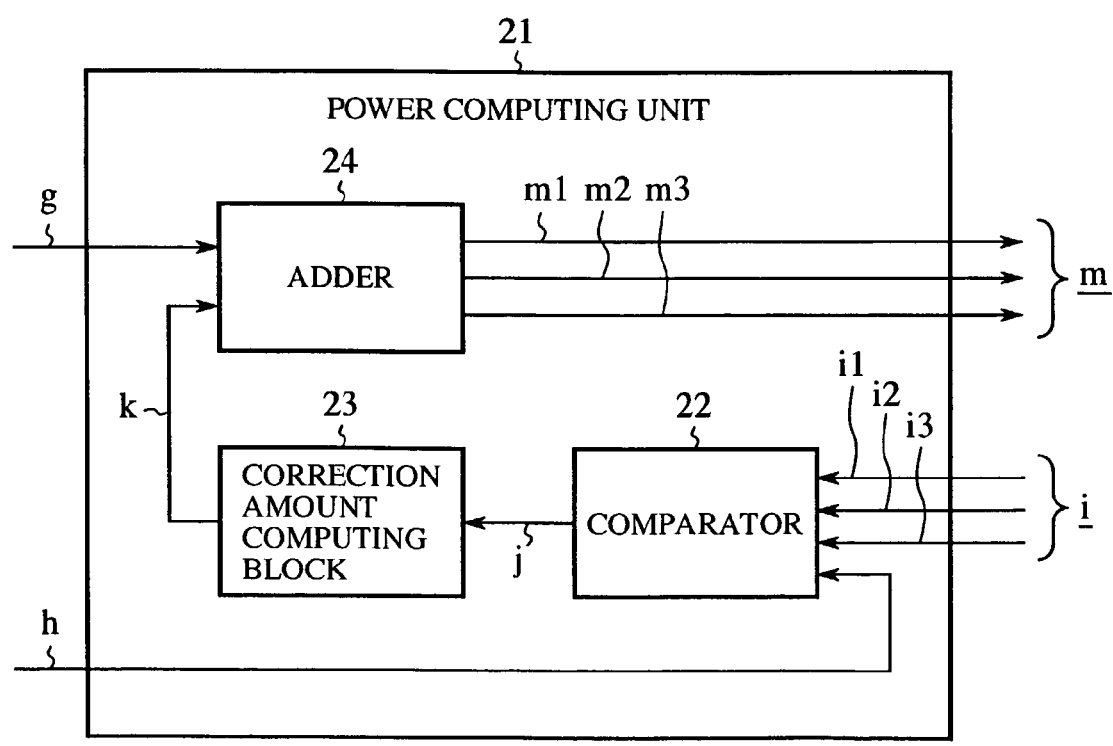
FIG. 9 is a block diagram showing the power computing unit in the RNC in FIG. 8.

FIG. 8 is a diagram showing the communication system in the embodiment 2 for carrying out the present invention, and in the figure, 19 denotes an RNC (central control means), and 20 denotes three BTS's (power control means) connected to the RNC 19. The respective BTS's 20 perform radio communication with mobile terminals in the respective corresponding cells 1, 2, and 3 (a plurality of radio areas). FIG. 9 is the power computing unit in the RNC 19 in FIG. 8, and in the figure, 21 denotes a power computing unit, 22 denotes a comparator, 23 denotes a correction computing unit, and 24 denotes an adder. g to m1, m2, and m3 are signals to be sent and received within the RNC 19 and between the RNC 19 and the respective BTSIs 20.

Now, the operation is described.

Sent to the RNC 19 from superordinate of the RNC 19 are the power indicating signal g of the CPICH transmitting power, and the reference indicating signal h consisting of the reference SIR and reference RACH number. That is, the control command set by superordinate is sent to the subordinate RNC 19. The RNC 19 gives the received power indicating signal g and reference indicating signal h to the power computing unit 21 within it. The power computing unit 21 gives the power indicating signals m1, m2, and m3 to the three BTS's 20, respectively, and stores the reference indicating signal h in the memory (not shown) of the comparator 22.

The respective BTS's 20 control the transmitting power or down-link transmitting power to mobile terminals based on the power indicating signals m1, m2, and m3. Accordingly, the ranges of the three cells 1, 2, and 3 are controlled by the power indicating signals m1, m2, and m3, respectively. And, each BTS 20 measures the reception SIR when it receives access from a mobile terminal existing in the corresponding cell. The measurement of the reception SIR allows the measurement of the number of mobile terminals existing in the corresponding sector. The BTS's 20 send measuring signals i1, i2, and i3 representing the measured reception SIR's to the RNC 19.

The power computing unit 21 of the RNC 19 stores the measurement signals i1, i2, and i3 received from the respective BTS's 20 in the memory of the comparator 22. The comparator 22 compares the stored reference SIR with the respective reception SIR's selected sequentially. The comparator 22 determines whether the reception SIR is larger or smaller than the reference SIR. And, if the reception SIR is smaller than the reference SIR, it inputs a plus compare signal j (for instance, 1) to the correction amount computing unit 23, and if the reception SIR is larger than the reference SIR, it inputs a minus compare signal j (for instance, 0) to the correction amount computing unit 23.

The correction amount computing block 23 computes a correction amount based on the inputted compare signal j, and inputs a correction signal k representing the computed correction amount to the adder 24. The adder 24 adds the correction amount to the CPICH transmitting power supplied from superordinate, and sends the power indicating signal (for instance, m2) of the corrected CPICH transmitting power to the BTS 20. This changes the transmitting power of the corresponding BTS 20, and the range of the corresponding cell (for instance, cell 2) changes. Further, also to the BTS 20 corresponding to the cells (for instance, cell 1 and cell 3 adjacent to that cell, the power indicating signals (for instance, m1 and m3) of the corrected CPICH transmitting power are sent.

That is, the RNC 19 determines whether or not the CPICH transmitting power has changed in a cell in any BTS 20, and if changed, it controls the CPICH transmitting power of the adjacent cells within the range of the maximum/minimum CPICH transmitting power specified by superordinate.

As obvious from the foregoing, in accordance with the embodiment 2, since there are provided the BTS 20 for controlling the transmitting power to a mobile terminal accessing one cell according to a control command when radio communication is performed between mobile terminals in one cell, and the RNC 19 for giving a control command to each of a plurality of BTS's to collectively control the transmitting power to mobile terminals in a plurality of cells, there is an advantage that reduction of interference and elimination of traffic maldistribution in a plurality of cells can be accomplished when radio communication is performed between mobile terminals for each cell. There is also an advantage that sufficient traffic control can be performed in a cell or in a plurality of cells.

Further, in the above embodiment 2, if the RNC 19 is made to correspond to the BTS 11 in the embodiment 1, and the plurality of BTS's 20 are made to correspond to the power computing unit 14 in the embodiment 1, then each sector in the embodiment 1 corresponds to each cell in the embodiment 2. Accordingly, the effect of controlling the down-link transmitting power to each cell and controlling the down-link transmitting power to a plurality of cells in the embodiment 2 is the same as the effect of controlling the down-link transmitting power to each sector and controlling the down-link transmitting power to one cell consisting of plurality of sectors in the embodiment 1.

INDUSTRIAL APPLICABILITY

As described above, the communication system and communication method according to the present invention is suitable for a system in which one power control means controls the transmitting power to a mobile terminal accessing one sector (or cell) according to a control command when radio communication is performed between a mobile terminal in the corresponding sector (cell), and the collective control means gives a control command to each of the plurality of power control means to collectively control the transmitting power to mobile terminals in a plurality of sectors (cells), thereby for accomplishing reduction of interference and elimination of traffic maldistribution in the plurality of sectors (or cells) when radio communication is performed between mobile terminals for each sector.

What is claimed is:

1. A base station, comprising:
a plurality of transceivers configured to transmit to mobiles in an area, each of said plurality of transceivers configured to transmit in a respective sub-area of said area;
a plurality of transmitting power controllers, each of said plurality of transmitting power controllers controlling transmitting power of a respective one of said plurality of transceivers, each of said plurality of transmitting power controllers controlled with an identical power indicating signal; and
a collective controller for giving said identical power indicating signal to each of said plurality of power controllers.

2. The base station according to claim 1, wherein said area is a cell, and
said sub-area is a sector of said cell.

3. The base station according to claim 1, wherein said area is a plurality of cells, and
said sub-area is one of said plurality of cells.

4. The base station according to claim 1, wherein said power controller is configured to control transmitting power of a common pilot channel transmitting power for
each period of a slot which is a predetermined amount of transmit-receive data, or
each period a frame consisting of a plurality of slots.

5. The base station according to claim 1, wherein said collective controller comprises:
means for determining the identical power indicating signal based on a number of mobile terminals serviced by each power controller.

6. The base station according to claim 1, wherein said collective controller comprises:
means for providing said identical power indicating signal to each power controller so as to prevent an absence of transmitting power between adjacent sub-areas and an overlap of transmitting power between adjacent sub-areas.

7. The base station according to claim 1, wherein said collective controller comprises:
means for receiving information concerning a common pilot channel transmitting power in each of said plurality of power controllers, and
means for controlling a reference signal to interference power ratio and a reference number of random access channels in each of said plurality of power controllers.

8. The base station according to claim 1, wherein the collective controller comprises:
means for defining a range of a maximum value and a minimum value of the common pilot channel transmitting power in each of said plurality of power controllers, and
means for controlling within said range, if a power controller autonomously performs power control in one sub-area, the common pilot channel transmitting power of a power controller corresponding to an adjacent sub-area.

9. The base station according to claim 1, wherein
each of said plurality of transmitting power controllers comprises a feedback to said collective controller, and
said collective controller is configured to adjust a power of one transceiver based on feedback from an adjacent transceiver.

10. The base station according to claim 1, wherein each of said plurality of transmitting power controllers comprises:
a power indicating signal input configured to receive the identical power indicating signal from said collective controller;
a reference signal input configured to receive a reference signal from said collective controller;
a feedback signal input configured to receive a feedback signal from a respective mobile;
a comparator connected to each of said reference signal input and said feedback signal input, and configured to output on a comparator output a compare signal based on a comparison of a reference signal and a feedback signal;
a correction amount computer connected to said comparator output and configured to output a transmission power correction signal on a correction amount computer output; and
an adder connected to said power indicating signal input and to said correction amount computer output, and configured to output a transmitting power command signal based on an addition of said transmission power correction signal and said identical power indicating signal.

11. The base station according to claim 1, wherein each of said plurality of transmitting power controllers further comprises:
a collective control feedback configured to relay said transmitting power command signal to said collective controller.

12. A mobile commuciations method, comprising;
transmitting from a base station to an area with a plurality of base station transceivers, each of said plurality of base station transceivers transmitting to a respective sub-area of said area; and
controlling transmitting power of each of said plurality of base station transceivers with an identical power indicating signal, each of said plurality of base station transceivers having a respective power controller controlled by said identical power indicating signal.

13. The mobile communications method according to claim 12, wherein
said area is a cell, and
said sub-area is a sector of said cell.

14. The mobile communications method according to claim 12, wherein
said area is a plurality of cells, and
said sub-area is one of said plurality of cells.

15. The mobile communications method according to claim 12, wherein said step of controlling transmitting power comprises:
controlling transmitting power of a common pilot channel transmitting power for each period of a slot which is a predetermined amount of transmit-receive data, or each period a frame consisting of a plurality of slots.

16. The mobile communications method according to claim 12, wherein said step of controlling transmitting power comprises:
controlling said transmitting power based on a number of mobile terminals serviced by each of said respective power controllers.

17. The mobile communications method according to claim 12, wherein said step of controlling transmitting power comprises:
preventing an absence of transmitting power between adjacent sub-areas and an overlap of transmitting power between adjacent sub-areas.

18. The mobile communications method according to claim 12, wherein said step of controlling transmitting power comprises:
receiving information concerning a common pilot channel transmitting power in each of said respective power controllers, and
controlling a reference signal to interference power ratio and a reference number of random access channels in each of said respective power controllers.

19. The mobile communications method according to claim 12, wherein said step of controlling transmitting power comprises:
defining a range of a maximum value and a minimum value of the common pilot channel transmitting power in each of said respective power controllers, and
controlling within said range, if a power controller autonomously performs power control in one sub-area, the common pilot channel transmitting power of a power controller corresponding to an adjacent sub-area.

20. The mobile communications method according to claim 12, wherein said step of controlling transmitting power comprises:
comparing a feedback signal with a reference signal to provide a comparison signal; and
adjusting said transmitting power based on said comparison signal.

* * * * *

UNITED STATES PATENT AND TRADEMARK OFFICE
CERTIFICATE OF CORRECTION

PATENT NO. : 7,349,712 B2
APPLICATION NO. : 10/204407
DATED : March 25, 2008
INVENTOR(S) : Takehiro Yoshimura It is certified that error appears in the above-identified patent and that said Letters Patent is hereby corrected as shown below:

On the Title Page, Item 22, change "Jan. 13, 2001" to --Jan. 31, 2001--.

Column 11, line 10, change "communciations" to --communications--.

Signed and Sealed this

Ninth Day of September, 2008

JON W. DUDAS
*Director of the United States Patent and Trademark Office*